A. J. GOURDIER.
CHAIN-LINK CLAMPS.

No. 173,166.  Patented Feb. 8, 1876.

Witnesses:
Henry Eichling
B. S. Clark

Inventor:
Augustus J. Gourdier
By Fitch & Fitch
His Attys.

UNITED STATES PATENT OFFICE.

AUGUSTUS J. GOURDIER, OF ATTLEBOROUGH, MASSACHUSETTS, ASSIGNOR TO SAMUEL S. GUINODO, OF SAME PLACE.

IMPROVEMENT IN CHAIN-LINK CLAMPS.

Specification forming part of Letters Patent No. 173,166, dated February 8, 1876; application filed January 6, 1876.

*To all whom it may concern:*

Be it known that I, AUGUSTUS J. GOURDIER, of Attleborough, in the county of Bristol and State of Massachusetts, have invented an Improved Link Clutch or Fastener for Chains, of which the following is a specification, reference being had to the accompanying drawings, forming a part hereof.

My invention relates chiefly to ornamental chains, such as are used for watches; and it consists in a metal cross-piece or clamp, as hereinafter particularly described, the ends of the arms of which are turned or hooked into the ends of the links of the chain, which are arranged about an interior supporting-piece, whereby the said links are clamped tightly together without the use of solder, while, at the same time, the groups of links thus clamped may be linked together.

Figure 1:
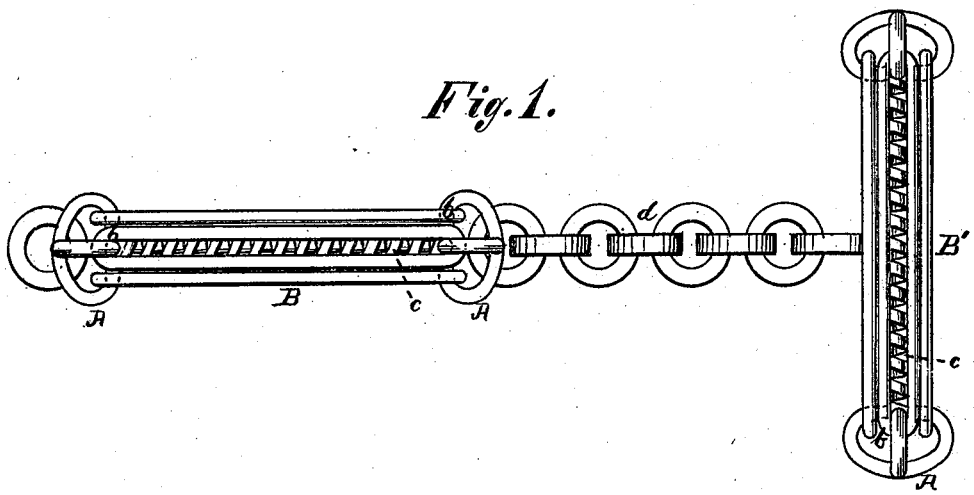
Figure 2:
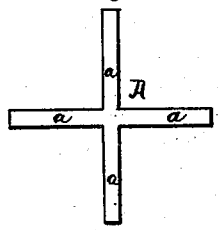
Figure 3:
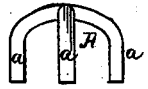
Figure 4:

Figure 1 shows a chain embodying my invention. Figs. 2 and 3 show the clamp in two stages of its manufacture, and Fig. 4 shows the clamp with its ends hooked inward, as upon the chain.

A is the clamp. This may be conveniently struck from a flat piece of suitable metal, in the form shown in Fig. 2, with the radiating arms $a$ adapted in number and locality to the number of the links to be clamped together.

By means of suitable machinery it is then given the form shown in Fig. 3, its arms being rounded and bent downward into a claw shape. I prefer to thus strike the clamp from one piece of metal, as it makes it stronger than if formed of two pieces of metal, or two wires or bars joined together, while, at the same time, it is less expensive.

B is a group of links $b$, which are arranged about an interior supporting-piece, $c$. This interior piece may be cylindrical or square, or of any desired number of sides; or it may be given an ornamental appearance by being made as a spiral, as shown in the drawings. A clamp, A, is placed upon the end of one of these groups of links, and the ends of the arms $a$, preferably by means of a suitable machine, are turned or hooked inward into the ends of the links $b$, which said ends project beyond the ends of the core-piece $c$, as shown. A clamp, A, is then placed in the same manner upon the opposite end of the links $b$, the ends of the clamp being similarly turned or hooked inward. A firmly-joined and finished group of links is thus formed without the use of solder, and, while being highly ornamental in appearance, it is not so liable to become broken or separated as when joined with solder.

The group of links thus formed and bound together may be used as a bar for an ornamental chain, as shown at B', or the several groups may be connected together by small loops or links $d$, which engage with the clamps at their curved ends, as shown. The entire chain may thus be put together without the use of solder.

What I claim as my invention, and desire to secure by Letters Patent, is—

The combination, with the links $b$, having the interior supporting-piece $c$, of the clamp A, as described, and for the purpose specified.

AUGUSTUS J. GOURDIER.

Witnesses:
 THOS. G. SANDLAND,
 BRAD. A. BENNETT.